United States Patent [19]

Stolka et al.

[11] Patent Number: 5,248,580

[45] Date of Patent: Sep. 28, 1993

[54] PHOTOCONDUCTIVE IMAGING MEMBERS WITH LADDER POLYMERS

[75] Inventors: Milan Stolka, Fairport; Martin A. Abkowitz, Webster, both of N.Y.; Beng S. Ong, Mississauga, Canada; Samson A. Jenekhe, Fairport, N.Y.

[73] Assignees: Xerox Corporation, Stamford, Conn.; University of Rochester, Rochester, N.Y.

[21] Appl. No.: 844,085

[22] Filed: Mar. 2, 1992

[51] Int. Cl.$^5$ .................. G03G 5/07; G03G 5/047
[52] U.S. Cl. ........................ 430/59; 430/58; 430/76; 430/78; 528/336; 528/342; 528/351; 528/353
[58] Field of Search .............. 430/58, 59, 76, 78; 528/342

[56] References Cited

U.S. PATENT DOCUMENTS

| | | | |
|---|---|---|---|
| 3,992,205 | 11/1976 | Wiedemann | 430/58 |
| 4,156,757 | 5/1979 | Graser et al. | 428/411 |
| 4,251,612 | 2/1981 | Chu et al. | 430/59 |
| 4,265,990 | 5/1981 | Stolka et al. | 430/59 |
| 4,429,029 | 1/1984 | Hoffman et al. | 430/57 |
| 4,556,622 | 12/1985 | Neumann et al. | 430/58 |
| 4,587,189 | 5/1986 | Hor et al. | 430/59 |
| 4,792,508 | 12/1988 | Kazmaier et al. | 430/59 |
| 4,882,254 | 11/1989 | Loutfy et al. | 430/59 |
| 4,983,741 | 1/1991 | Katayama et al. | 548/324 |
| 5,055,367 | 10/1991 | Law | 430/59 |

*Primary Examiner*—Roland Martin
*Attorney, Agent, or Firm*—E. O. Palazzo

[57] ABSTRACT

A photoconductive imaging member comprised of a supporting substrate, a photogenerating layer comprised of a ladder polymer selected from the group consisting of those represented by the following formulas:

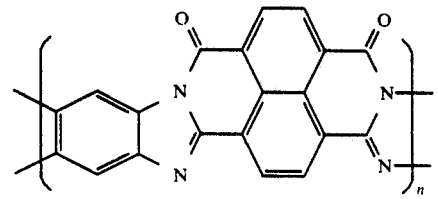

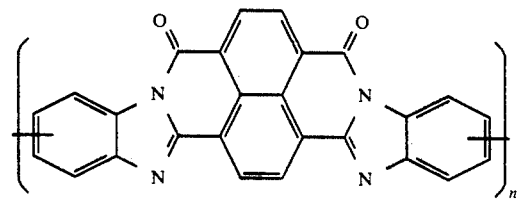

and mixtures thereof, wherein n represents the number of segments, and a charge transport layer.

36 Claims, 3 Drawing Sheets

PHOTOCONDUCTIVE IMAGING MEMBERS WITH LADDER POLYMERS

BACKGROUND OF THE INVENTION

This invention is generally directed to ladder polymers and to imaging members thereof. More specifically, the present invention is directed to ladder polymer infrared photogenerating pigments, and imaging members thereof. In one embodiment of the present invention, there are provided layered photoconductive imaging members with improved xerographic properties, inclusive of high charge acceptance, low dark decay, high photosensitivity in the wavelength regions of from about 700 to about 820 nanometers, and maximum or peak photosensitivity in the wavelength regions of from about 750 to about 760 nanometers, enabling their selection for electrophotographic, especially xerographic, imaging systems and printers sensitive to near infrared wavelengths. In one embodiment imaging members with photoconductive layers comprised of the ladder polymers illustrated herein, and charge or hole transport layers, especially those comprised of aryl amines, which members are sensitive to light in the wavelength region of from about 700 to about 820 nanometers. The resulting members are responsive to red illumination originating from light emitting diode (LED) printing apparatuses. The photoresponsive imaging members of the present invention can, for example, contain situated between a photogenerating layer and a charge transporting layer, or situated between a photogenerating layer and a supporting substrate with a charge transport layer in contact with the photogenerating layer, a photoconductive composition comprised of the ladder polymer photogenerating pigments illustrated herein.

In another embodiment of the present invention, there are provided imaging members with a photoconductive layer comprised solely of the ladder polymers illustrated herein, that is an imaging member with a layer that functions simultaneously both as charge generating layer and transport layer.

Certain layered imaging members are known, including those comprised of separate generating layers, and transport layers as described in U.S. Pat. No. 4,265,990, the disclosure of which is totally incorporated herein by reference; and overcoated photoresponsive materials containing a hole injecting layer overcoated with a hole transport layer, followed by an overcoating of a photogenerating layer; and a top coating of an insulating organic resin, reference U.S. Pat. No. 4,251,612. Examples of photogenerating layers disclosed in these patents include trigonal selenium and phthalocyanines, while examples of transport layers include certain diamines as mentioned therein.

The following United States patents are mentioned: U.S. Pat. No. 4,299,896 which discloses imaging members with a photosensitive layer selected from the disazo pigments of the formulas illustrated, for example, in the Abstract, and in column 2; U.S. Pat. No. 4,314,015 wherein the disazo pigments for the imaging member are of the formula as illustrated in the Abstract, for example, and column 2; U.S. Pat. No. 4,666,810 wherein the azo pigments are illustrated in column 2 for example; and U.S. Pat. No. 4,797,337 wherein the disazo photogenerating pigment is of the formula as illustrated in the Abstract, for example, which disazos may contain a $SO_2$ group.

U.S. Pat. No. 4,713,307, the disclosure of which is totally incorporated herein by reference, discloses photoconductive imaging members containing a supporting substrate, certain azo pigments as photogenerating materials, and a hole transport layer that preferably contains an aryl diamine compound dispersed in an inactive resinous binder.

U.S. Pat. No. 4,797,337, the disclosure of which is totally incorporated herein by reference, discloses a photoconductive imaging member comprising a supporting substrate, a hole transport layer, and a photogenerating layer comprising specific disazo compounds.

Additional references illustrating layered organic electrophotographic photoconductor elements with azo, bisazo, and related compounds include U.S. Pat. Nos. 4,390,611, 4,551,404, and 4,596,754, Japanese Patent 60-64354, U.S. Pat. Nos. 4,400,455, 4,390,608, 4,327,168, 4,299,896, 4,314,015, 4,486,522, 4,486,519, 4,555,667, 4,440,845, 4,486,800, 4,309,611, 4,418,133, 4,293,628, 4,427,753, 4,495,264, 4,359,513, 3,898,084, 4,830,944, and 4,820,602, and Japanese Patent Publication 60-111247.

U.S. Pat. No. 4,755,443 discloses a photoreceptor for electrophotography which comprises a charge carrier generating material and charge transport material wherein one charge generating material is a metal phthalocyanine or a metal-free phthalocyanine. The layer containing the generator material also contains an organic amine. Other carrier generating substances can be used in combination with the phthalocyanine generator material, including azo pigments, anthraquinone dyes, perylene dyes, polycyclic quinone dyes, and methine stearate pigments.

U.S. Pat. No. 4,424,266 discloses an electrophotographic photosensitive element having a conductive support and a photosensitive layer comprising a carrier generating phase layer containing a carrier generating material selected from the group consisting of perylene dyes, polycyclic quinones, and azo dyes, and a carrier transporting phase layer containing a hydrazone carrier transporting material. The carrier generator materials can be used either singly or in combination.

U.S. Pat. No. 4,882,254, the disclosure of which is totally incorporated herein by reference, discloses a layered photoresponsive imaging member which comprises a supporting substrate, a photogenerator layer comprising a mixture of first and second pigments, and an aryl amine hole transport layer. The mixture of pigments is selected from perylenes and phthalocyanines, polycyclic quinones and phthalocyanines, or perinones and phthalocyanines.

Photoresponsive imaging members containing perinone and perylene compounds are also known. For example, European Patent Publication 0040402, DE3019326, filed May 21, 1980, discloses the use of N,N'-disubstituted perylene-3,4,9,10-tetracarboxyldiimide pigments as photoconductive substances.

Imaging members with phthalocyanine materials are also known as disclosed in, for example, U.S. Pat. Nos. 3,594,163, 3,657,272, 3,816,118, 3,862,127, 3,903,107, 3,927,026, 3,932,180, 3,932,454, 4,031,109, 4,098,795, and Re. 27,117, the disclosures of each of which are totally incorporated herein by reference.

The disclosures of each of these patents and publications are totally incorporated herein by reference.

SUMMARY OF THE INVENTION

It is an object of the present invention to provide single layer and layered imaging members with many of the advantages illustrated herein.

Another object of the present invention is to provide certain photoconductive and photogenerating ladder polymers, and imaging members thereof, which members can be sensitive to wavelengths of from about 700 to about 820 and preferably from about 750 to about 770 nanometers.

In another object of the present invention there are provided photoconductive and photogenerating ladder polymers, and imaging members thereof, which members are substantially insensitive to visible light from about 400 to about 700 nanometers.

Another object of the present invention resides in the provision of layered photoresponsive imaging members which can possess excellent dark decay properties, high charge acceptance values, and electrical stability.

Further, in another object of the present invention there are provided photoconductive imaging members that can be responsive to radiation from LED devices.

Additionally, another object of the present invention resides in the provision of imaging and printing methods with the photoconductive imaging members illustrated herein.

In another object of the present invention there are provided layered imaging members with imidazoquinoline ladder polymers, which polymers are thermally and mechanically robust, that is the ladder polymers are heat resistant to 250° to 300° C., exhibit high mechanical strength and which polymers provide materials that are readily processable, soluble or tractable, and formable with useful electrooptic and excellent electrical characteristics. These polymers also exhibit good mechanical properties such as high tensile strength, high modulus and exceptional solvent and chemical resistance. Further, the ladder polymers may be selectively solubilized by complexation with, for example, metal halide Lewis acids as described, for example, by Jenekhe and Johnson in Macromolecules, 23, 4419 (1990) and references therein, particularly references 16 to 24, the disclosures of which are totally incorporated herein by reference.

The aforementioned ladder polymers may be doped with either p or n type components known in the semiconductor art, including for example $I_2$, $AsF_5$, $FeCl_3$, K and the like, to impart desired conductivities thereof.

Further, the ladder polymers in embodiments tolerate exposure to very high temperatures, about 310° C., thus there can be enabled the solventless fabrication of imaging members comprising these polymers, such as by heat lamination, melt extrusion, and the like.

In yet another object of the present invention in embodiments there are provided layered imaging members with a substantially uniform, amorphous, nonparticulate photoconductive or photogenerating layer, thereby minimizing, or avoiding final print defects.

These and other objects of the present invention in embodiments thereof can be accomplished by the provision of single layer or multilayered imaging members thereof. More specifically, the present invention is directed to photoconductive imaging members with a photoconductive ladder compound such as an imidazoquinoline ladder polymer like poly(7-oxo-7,10H-benz[de]-imidazo(4',5':5,6) benzimidazo[2,1-a] isoquinoline-3,4:10,11-tetrayl)-10-carbonyl), which polymers may be a cis-, trans- or mixture of cis- and trans-isomers referred to as BBL or poly(benzimidazole-benzophenanthroline)-type ladder and closely structurally related benzimidazole-benzophenanthroline-type semiladder polymer hereinafter referred to as BBB which polymers may be a cis-, trans- or mixture of cis- and trans-isomers. Examples of ladder polymers that may be selected as the photogenerating pigments for the imaging members of the present invention include those of formulas illustrated in FIGS. 4 through 9, representing the representative structures of BBL, BBB, BBL-N, BBL-P, BBL-DBF and BBL-AQ, respectively, where the subscript n is an integer representing the number of segments, and the value of which in embodiments is greater than about 10, and is in the range of from about 10 to about 1,000.

The ladder polymers of the present invention may be prepared and characterized by the methods of S. A. Jenekhe and P. O. Johnson, described in Macromolecules, 23, 4419 (1990) and references therein, the disclosures of which are incorporated herein in their entirety.

BBL can be prepared by a two step dehydrohalogenationpolycondensation sequence using 1,4,5,8-naphthalene tetracarboxylic acid (NTCA) and 1,2,4,5-tetraaminobenzene tetrahydrochloride (TABH). Initially, TABH was heated with polyphosphoric acid to to liberate hydrogen chloride gas and to afford 1,2,4,5-tetraaminobenzene in situ. Next, NTCA and then phosphorous pentoxide are added to the vessel and then heated under an inert and anhydrous atmosphere to effect polycondensation of NTCA and TABH in approximately equimolar amounts. This product is high melting and metallic golden-green in appearance.

BBB semi-ladder was prepared by the polycondensation of NTCA and 3,3'-diaminobenzidine (DABD) using a procedure analogous to the aforementioned BBL synthesis. Pure, chlorine free, DABD was polycondensed also with NTCA in approximately equimolar amounts. This product was high melting and similar in appearance to the aforementioned BBL.

The resulting ladder and semi-ladder polymers were characterized by intrinsic viscosity, thermogravimetric analysis, infrared spectra, and electronic absorption spectra of thin films.

Thin films were conveniently prepared for characterization by spin coating onto glass substrates from dilute solutions, for example 1.8 to 2 weight percent, of complexed ladder-type polymers in admixture with aluminum chloride and nitromethane.

In one embodiment, there is envisioned a layered photoresponsive member comprised of a supporting substrate, a photoconductive layer comprised of the ladder or semi-ladder polymer compounds illustrated herein, and situated between the supporting substrate, and the photoconductive layer a charge transport layer. In one specific illustrative embodiment, the photoresponsive device can be comprised of (1) a supporting substrate, (2) a hole blocking layer, (3) an optional adhesive interface layer, (4) a photogenerating layer comprised of a ladder polymer, or mixtures thereof, and (5) a charge transport layer. Thus, a specific photoresponsive device of the present invention can be comprised of a conductive supporting substrate, a hole blocking metal oxide layer in contact therewith, an adhesive layer, a photogenerating layer comprised of the ladder compounds, respectively, of the formulas as represented by FIGS. 4, 5, 6, 7, 8 or 9 overcoated on the optional adhesive layer, and as a top layer a hole transport layer comprised of certain diamines dispersed in a resinous matrix. The photoconductive layer composition when in contact with the hole transport layer is capable of allowing holes generated by the photogenerating layer to be transported. Examples of aryl amine hole transport molecules that may be selected for the photoconductor devices are illustrated in U.S. Pat. No. 4,265,990, the disclosure of which is totally incorporated herein by reference. Also, examples of charge transport molecules are illustrated in U.S. Pat. No. 4,921,773 and the patents mentioned therein, the disclosures of each of the aforementioned patents, including the '773 patent, being totally incorporated herein by reference.

Another advantage of using BBL and BBB as charge generator polymers includes the ability to form a charge generation layer that is homogeneous and nonparticulate. A charge generator layer that is homogeneous and nonparticulate eliminates irreproducibilities associated with the particulate nature of the generation layer, for example, the stability of the coating dispersions, particle size, distribution of particle sizes, and the way charge generator pigment particles organize themselves during the coating and curing process. Organization of particles may affect the charge migration process. Charge generation layers prepared from ladder type polymers of the present invention exhibit substantially none of the disadvantages associated with inhomogenous and particulate generator layers.

The photoresponsive devices described herein can be incorporated into various imaging systems such as those conventionally known as xerographic imaging processes. Additionally, the imaging members of the present invention can be selected for imaging and printing systems with near red and/or infrared light. In this embodiment, the photoresponsive devices may be negatively or positively charged, exposed to light in a wavelength of from about 700 to about 820, and preferably 740 to 800 nanometers, either sequentially or simultaneously, followed by developing the resulting image and transferring to paper. Additionally, the imaging members of the present invention can be selected for imaging and printing systems with visible light. In this embodiment, the photoresponsive devices may be negatively or positively charged, exposed to light in a wavelength of from about 400 to about 700 nanometers. The ladder polymers are insensitive in this region and would not participate in the charge generation process thereby enabling multiple exposure light selective imaging processes.

BRIEF DESCRIPTION OF THE FIGURES

For a further understanding of the the present invention, the following detailed description of various embodiments is provided wherein.

DESCRIPTION OF SPECIFIC EMBODIMENTS

Specific embodiments of the invention will now be illustrated, it being noted that substantially equivalent imaging members are also embraced within the scope of the present invention.

Figure 1:
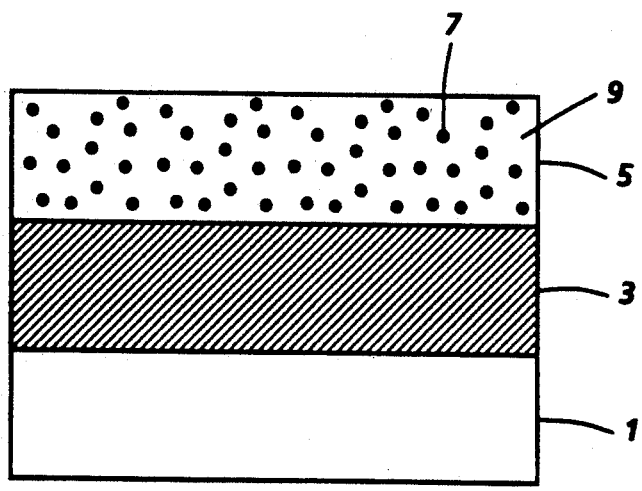
FIGS. 1, 2 and 3 are partially schematic views of examples of photoconductive imaging members of the present invention.
Figure 4:
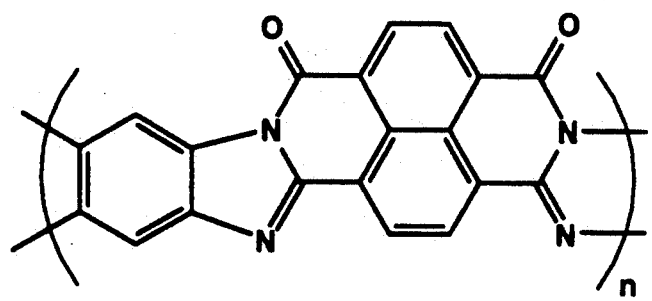
FIGS. 4, 5, 6, 7, 8 and 9 are formulas representative of ladder polymer compounds of the present invention, which polymers are believed to contain mixtures of both cis and trans isomeric segments in embodiments.
Figure 5:
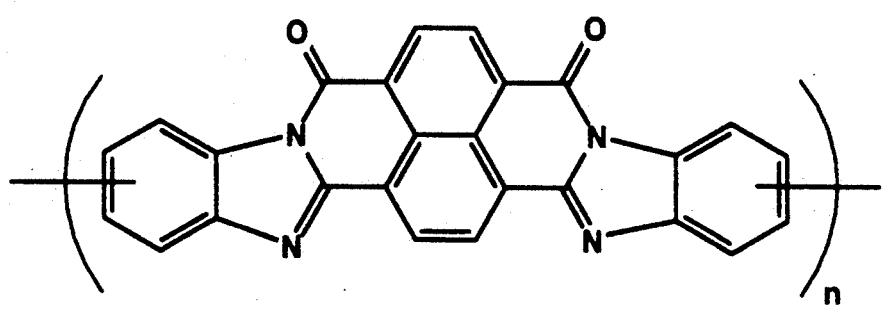
Figure 6:
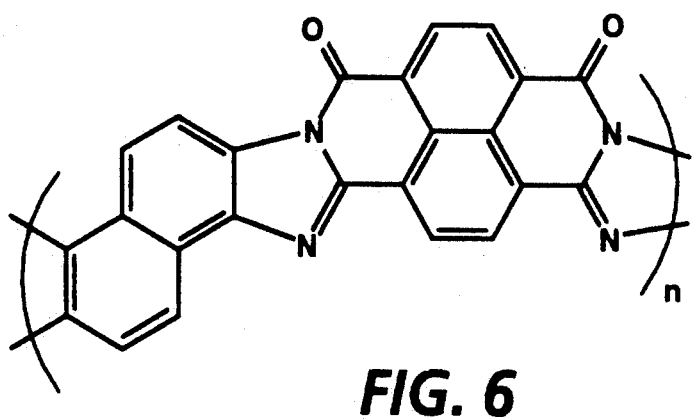
Figure 7:
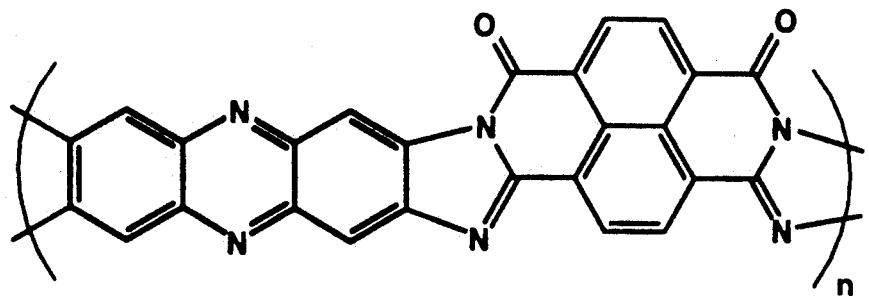
Figure 8:
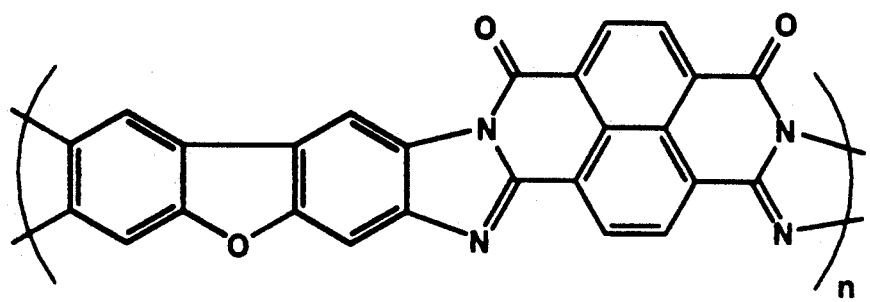
Figure 9:
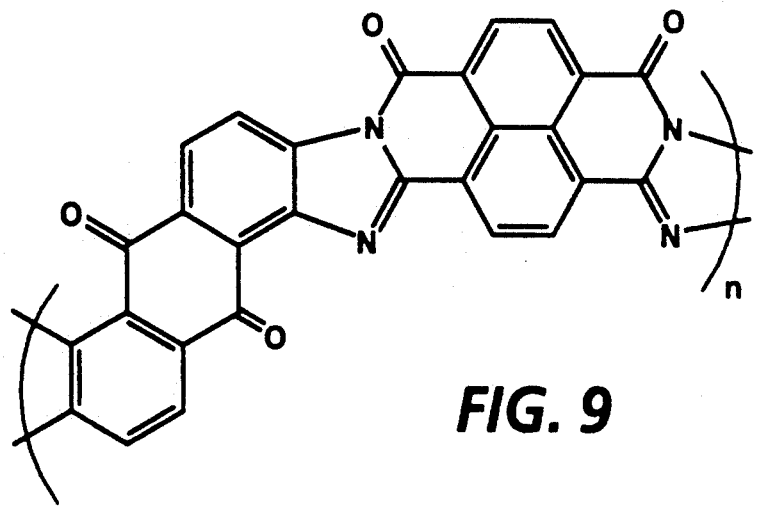

FIG. 1 illustrates a photoconductive imaging member of the present invention comprising a supporting substrate 1, a photogenerating layer 3 comprised of a ladder polymer selected from the formulas shown in FIGS. 4 through 9, and preferably the formulas of FIG. 4 or 5 as illustrated herein, and an optional charge carrier hole transport layer 5, which comprises hole charge transporting molecules 7 dispersed in an inactive resinous binder composition 9. Layer 5 can be comprised solely of an optional hole transporting polymer, such as poly(-methylphenylsilylene), poly(arylamine carbonates), poly(ether carbonates), and the like.

Figure 2:
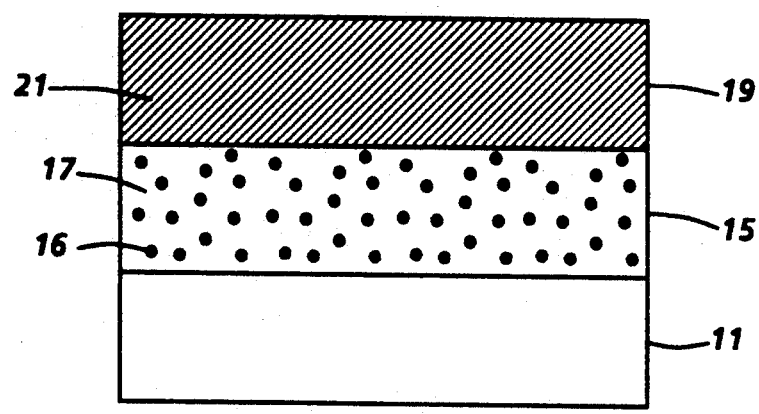

FIG. 2 illustrates essentially the same member as that shown in FIG. 1 with the exception that the hole transport layer is situated between the supporting substrate and the photogenerating layer. More specifically, this Figure illustrates a photoconductive imaging member comprising a supporting substrate 11, a hole transport layer 15 comprising aryl amine hole transport molecules 16 dispersed in an inactive resinous binder composition 17, and a photogenerating layer 19 comprising the ladder polymer compound 21 of the formula of FIG. 5 as illustrated herein, especially those as represented by FIGS. 4 or 5.

Figure 3:
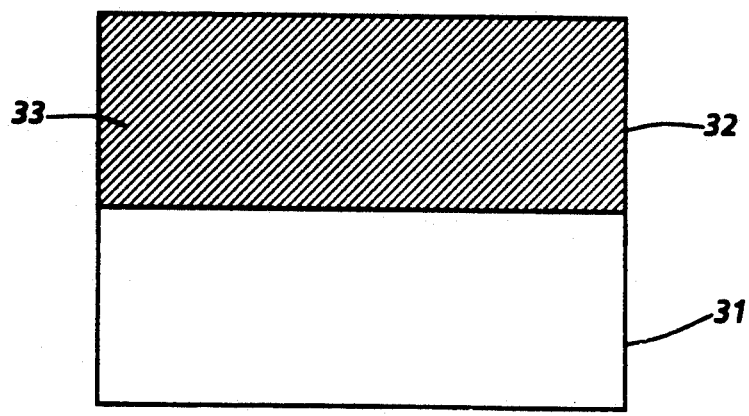

FIG. 3 illustrates a photoconductive imaging member of the present invention comprising a supporting substrate 31, a photoconductive layer 32 comprising the ladder polymer 33, and an optional charge transport layer 35 comprised of aryl diamine molecules 36 dispersed in a MAKROLON ® polycarbonate binder 37.

The supporting substrate of the imaging members may comprise an insulating material such as an inorganic or organic polymeric material, including MYLAR ®, a commercially available polymer, and titanized MYLAR ®; a layer of an organic or inorganic material having a semiconductive surface layer such as indium tin oxide or aluminum arranged thereon; or a conductive material such as aluminum, titanium, chromium, nickel, brass, or the like. The substrate may be flexible, seamless, or rigid and may have a number of different configurations, such as a plate, a cylindrical drum, a scroll, an endless flexible belt, and the like. In one embodiment, the substrate is in the form of an endless flexible belt. In some situations, it may be desirable to coat an anticurl layer, such as polycarbonate materials commercially available as MAKROLON ® from Farbenfabricken Bayer AG, on the back of the substrate, particularly when the substrate is an organic polymeric material.

The thickness of the substrate layer depends on a number of factors, including economic considerations, the components of the other layers, and the like. Thus, this layer may be of substantial thickness, for example up to 125 mils, or of minimal thickness provided that there are no adverse effects on the resulting imaging device or process. In embodiments, the thickness of this layer is from about 3 mils to about 20 mils.

Generally, the photogenerating or photoconductive layer has a thickness of from about 0.05 micron to about 25 microns or more and preferably from 1 to about 5 microns. The thickness of the polymeric charge generation layer is dependent primarily on the wavelength of the incident light. For example, if the xerographic imaging is done using visible light (400 to 700 nanometers range) where these polymers are strongly absorbing, thin generation layers (about 0.2 to 2 microns) will suffice; if near infrared light, as produced by solid state lasers near 780 nanometers, is used for imaging, thicker generation layers (typically 5 to 30 microns) may be needed. Optionally, single layer photoconductors comprised solely of the ladder polymers described earlier can be used. Generally, it is desirable to provide this layer in a thickness sufficient to absorb a substantial amount, for example, from about 80 to about 90 percent or more, of the incident radiation which is directed upon it in the imagewise or printing exposure step. The maximum thickness of this layer is also dependent upon factors such as mechanical considerations, the thicknesses of the other layers, and whether a flexible photoconductive imaging member is desired.

The charge transport layer can be comprised of various components providing, for example, that they effectively transport charges (holes) such as an aryl amine compound dispersed in a resinous binder and other components, reference the '773 patent mentioned herein, the disclosure of which is totally incorporated herein by reference, and U.S. Pat. No. 4,933,245, the disclosure of which is totally incorporated herein by reference. In one embodiment, the charge charge transport layers are comprised of aryl amine compounds of the formula:

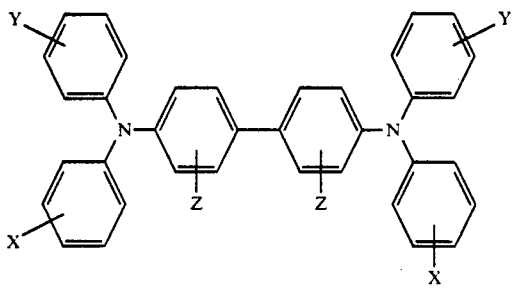

wherein X, Y and Z are selected from the group consisting of hydrogen, an alkyl group with, for example, from 1 to about 25 carbon atoms such as methyl, ethyl, propyl, isopropyl, and the like, and a halogen preferably chlorine, and at least one of X, Y and Z is independently an alkyl group or chlorine. When Y and Z are hydrogen, the amine is N,N'-diphenyl-N,N'-bis(alkylphenyl)-[1,1'-biphenyl]-4,4'-diamine wherein the alkyl is, for example, methyl, ethyl, propyl, n-butyl, or the like, or N,N'-diphenyl-N,N'-bis(chlorophenyl)-[1,1'-biphenyl]-4,4'-diamine. Preferably, X is selected from the group consisting of methyl and chloride in either the ortho, meta, or para positions. Suitable inactive binder materials for the hole transport layer include known highly insulating resins, which generally have a resistivity of at least $10^{12}$ ohm-cm to prevent undue dark decay. Compounds corresponding to the above formula include N,N'-diphenyl-N,N'-bis(alkylphenyl)-[1,1'-biphenyl]-4,4'-diamine, wherein alkyl is selected from the group consisting of methyl, such as 2-methyl, 3-methyl and 4-methyl, ethyl, propyl, butyl, hexyl, and the like. With halo substitution, the amine is N,N'-diphenyl-N,N'-bis(-halo phenyl)-[1,1'-biphenyl]-4,4'-diamine, wherein halo is 2-chloro, 3-chloro or 4-chloro. Other electrically active small molecules that can be dispersed in the electrically inactive resin to form a layer which will transport holes include bis(4-diethylamino-2-methylphenyl)-phenyl methane, 4',4''-bis(diethylamino)-2',2''-dimethyltriphenyl methane, bis-4-(diethylaminophenyl)phenyl methane, and 4,4'-bis(diethylamino)-2,2'-dimethyltriphenyl methane. Generally, the hole transport layer has a thickness of from about 5 to about 75 microns, and preferably of from about 10 to about 40 microns.

Charge transport layers are well known in the art. Typical transport layers are described, for example, in U.S. Pat. Nos. 4,265,990; 4,609,605; 4,297,424 and 4,921,773, the disclosures of each of these patents being totally incorporated herein by reference. Organic charge transport materials can also be employed. Typical charge, especially hole transporting materials include the following:

Hole transport molecules of the type described in U.S. Pat. Nos. 4,306,008; 4,304,829; 4,233,384; 4,115,116; 4,299,897 and 4,081,274, and U.S. Pat. No. 5,139,910 (D/90394), the disclosures of each of which are totally incorporated herein by reference, can be selected for the imaging members of the present invention. Typical diamine hole transport molecules include N,N'-diphenyl-N,N'-bis(3-methylphenyl)-(1,1'-biphenyl)-4,4'-diamine, and the like.

Pyrazoline transport molecules as disclosed in U.S. Pat. Nos. 4,315,982; 4,278,746 and 3,837,851, the disclosures of each of which are totally incorporated herein by reference, can also be selected in embodiments.

Substituted fluorene charge transport molecules as described in U.S. Pat. No. 4,245,021, the disclosure of which is totally incorporated herein by reference, can also be selected in embodiments.

Oxadiazole transport molecules, such as 2,5-bis(4-diethylaminophenyl)-1,3,4-oxadiazole, pyrazoline, imidazole, triazole, and the like may also be selected as charge transport molecules in embodiments. Other typical oxadiazole transport molecules are described, for example, in German Patents 1,058,836; 1,060,260 and 1,120,875, the disclosures of each of which are totally incorporated herein by reference, can also be selected in embodiments.

Other specific hole transports include hydrazone transport molecules, such as p-diethylamino benzaldehyde-(diphenylhydrazone), 4-methoxynaphthlene-1-carbaldehyde, 1-methyl-1-phenylhydrazone, and the like. Other typical hydrazone transport molecules are described, for example, in U.S. Pat. Nos. 4,150,987; 4,385,106; 4,338,388; 4,387,147; 4,256,821 and 4,297,426, the disclosures of each of which are totally incorporated herein by reference. Other specific transport molecules are described in U.S. Pat. Nos. 3,895,944; 3,820,989 and 3,870,516, the disclosures of which are totally incorporated herein by reference.

Other useful charge transport materials that may be selected, it is believed, include those described in the following patents, the disclosures of which are incorporated by reference in their entirety: U.S. Pat. Nos. 4,806,443, 4,818,650, 4,806,444, 4,935,487, 4,956,440, 4,801,517, 5,028,687, and 5,030,532.

Still another class of charge transporting polymers are represented by the polysilylene formula:

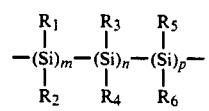

wherein $R_1$, $R_2$, $R_3$, $R_4$, $R_5$, and $R_6$ are independently selected from the group consisting of alkyl, aryl, substituted alkyl, substituted aryl, and alkoxy; and m, n, and p are numbers that reflect the percentage of the particular monomer unit in the total polymer composition with the sum of m plus n plus p being equal to 100 percent, for example, as described in U.S. Pat. No. 4,839,451, the disclosure of which is incorporated herein by reference in its entirety.

Some illustrative examples of the polysilylene transport layers include poly(methylphenyl silylene), poly(methylphenyl silylene-codimethyl silylene), poly(cyclohexylmethyl silylene), poly(tertiarybutylmethyl silylene) poly(phenylethyl silylene), and the like, which polysilylenes generally have a weight average molecular weight of from about 100,000 to about 2,000,000.

Examples of highly insulating and transparent resinous components or inactive binder resinous material for the transport layer include materials such as those described in U.S. Pat. No. 3,121,006, the disclosure of which is totally incorporated herein by reference. Specific examples of suitable organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. The materials most preferred as electrically inactive resinous materials in embodiments of the present invention are poly(4,4'-dipropylidine-diphenyline carbonate) with a weight average molecular weight of from about 35,000 to about 40,000, available as LEXAN 145 TM from General Electric Company; poly(4,4'-isopropylidine-diphenyline carbonate) with a weight average molecular weight of from about 40,000 to about 45,000, available as LEXAN 141 TM from General Electric Company; a polycarbonate resin having a weight average molecular weight of from about 50,000 to about 100,000, available as MAKROLON® from Farbenfabricken Bayer AG; and a polycarbonate having a weight average molecular weight of from about 20,000 to about 50,000, available as MERLON TM from Mobay Chemical Company. Generally, the resinous binder contains from about 10 to about 75 percent by weight of the active material corresponding to the foregoing formula, and preferably from about 35 percent to about 50 percent of this material.

The photoconductive imaging member may optionally contain a hole blocking layer situated between the supporting substrate and the photogenerating layer. This layer may comprise metal oxides, such as aluminum oxide and the like, or materials such as silanes, nylons, and the like. The primary purpose of this layer is to prevent hole injection from the substrate during and after charging. Typically, this layer is of a thickness of about 5 to about 300 Angstroms, although it may be as thick as 2 microns in some instances.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is, for example, of a thickness of less than about 0.6 micron with a thickness range of from about 0.05 to about 1 micron being suitable in embodiments of the present invention.

Imaging members of the present invention exhibit excellent xerographic properties in embodiments thereof. For example, values for dark development potential ($V_{ddp}$) can range from about −400 volts to about −975 volts provided that the aforementioned hole transporting layers are used in conjunction with the charge generating polymers, or provided that the charge generating polymers are used as single layer photoconductors of from about +400 volts to about +975 volts if the aforementioned hole transporting layers are used in conjunction with the charge generating polymers in an inverted mode where the hole transporting layer is sandwiched between the charge generating polymer layer and the substrate material, or if the charge generating polymers are used as single layer photoconductors. Preferred ranges for dark development potential for the imaging members of the present invention are usually from about −400 to about −900 or about +400 to about +900 volts, respectively, with −800 or +800 volts, respectively, being especially preferred in embodiments. High dark development potentials permit high contrast potentials, which result in images of high quality with essentially no background development.

The imaging members of the present invention in embodiments thereof also exhibit low dark decay values of, for example, about 50 volts per second or less. Low dark decay values can be of importance for developing high quality images since dark decay measures the amount of charge that disappears after charging of the photoreceptor, and a large difference in charge between exposed and unexposed areas of the photoreceptor results in images with high contrast. Acceptable values for dark decay vary depending on the design of the imaging apparatus in which the imaging members are contained. This dark decay may be as high as 100 volts per second with 50 volts and 10 to 20 volts per second being preferred in embodiments.

Residual potential values ($V_R$) for the imaging members of the present invention in embodiments thereof are excellent, ranging from, for example, about −5 volts to about −50 volts or about +5 to about +50 volts, respectively. Residual potential is a measure of the amount of charge remaining on the imaging member after erasure by exposure to light and prior to imaging. Residual potentials of −5 to −15 volts or +5 to +15 volts are considered exceptional and preferred.

Photosensitivity values ($E_{0.5ddp}$ at 750 nanometers) for the imaging members of the present invention in embodiments thereof are acceptable and in some instances excellent, and can be, for example, from about 2 to about 25 ergs per square centimeter. Acceptable photosensitivity values vary depending on the design of the imaging apparatus in which the imaging members are contained; thus, in some instances, values as high as 40 or 50 are acceptable, and values of less than about 5 may be preferred.

The present invention also encompasses a method of generating images with the photoconductive imaging members disclosed herein. The method comprises the steps of generating an electrostatic image on a photoconductive imaging member of the present invention, subsequently developing the electrostatic image with known developer compositions comprised of resin particles, pigment particles, additives, including charge control agents and carrier particles, reference U.S. Pat. Nos. 4,558,108; 4,560,535; 3,590,000; 4,264,672; 3,900,588 and 3,849,182, the disclosures of each of these patents being totally incorporated herein by reference, transferring the developed electrostatic image to a suitable substrate, and permanently affixing the transferred image to the substrate. Development of the image may be achieved by a number of methods, such as cascade, touchdown, powder cloud, magnetic brush, and the like. Transfer of the developed image to a substrate may be by any method, including those wherein a corotron or a biased roll is selected. The fixing step may be performed by means of any suitable method, such as flash fusing, heat fusing, pressure fusing, vapor fusing, and the like.

The imaging members of the present invention can be prepared by a number of different known processes, such as those illustrated in copending application U.S. Ser. No. 07/617,234, now abandoned, filed Nov. 5, 1990, the disclosure of which is totally incorporated herein by reference. In one process embodiment, the photogenerator pigment is coated onto a supporting substrate with a Bird applicator, for example, followed by the solution coating of the charge transport layer, and thereafter drying in, for example, an oven.

The following Examples are being supplied to further define various species of the present invention, it being noted that these Examples are intended to illustrate and not limit the scope of the present invention. Parts and percentages are by weight unless otherwise indicated.

PURIFICATION OF REACTANTS AND REAGENTS:

1,4,5,8-Naphthalene tetracarboxylic acid (NTCA), 97 percent pure, from Aldrich Chemical Company was purified as follows: 10 grams of NTCA were dissolved in 1,000 milliliters of deionized water containing 84 grams of potassium hydroxide at 60° C. Subsequently, 20 grams of activated charcoal were added to the aforementioned solution, which was then stirred for 10 minutes. The resulting suspension was filtered through a combination of Celite and Whatman filter paper under vacuum. This decolorization procedure was repeated to obtain a faint yellow color filtrate. Four (4) grams of potassium permanganate were dissolved in 80 milliliters of water at 90° C. and was added to the filtrate obtained. The dark solution was filtered while still hot through fritted glass. The filtrate was allowed to cool down to 60° C. before decolorizing further with 20 grams of activated charcoal and filtered through a combination of Celite and filter paper. The filtration step was repeated with Whatman paper to ensure complete removal of traces of solids. The addition of 120 milliliters of hydrochloric acid was used to precipitate out NTCA. The material was filtered, washed with deionized water and dried under vacuum over phosphorous pentoxide at 60° C. for 24 hours.

1,2,4,5-Tetraaminobenzene tetrahydrochloride (TABH), technical grade, obtained from Fluka Chemical Company, was purified by the method reported by F. E. Arnold and R. L. Van Deusen, Macromolecules, 2, 497 (1969). 500 milliliters of deionized water was boiled while bubbling nitrogen (ultra high purity grade) through. Subsequently, 50 milliliters of concentrated hydrochloric acid were added while maintaining the nitrogen stream. Ten (10) grams of TABH was dissolved in the aqueous HCl solution and 7 grams of activated charcoal were added. The suspension was stirred for 15 minutes then filtered through fritted glass. Thereafter, 100 milliliters of concentrated HCl were added to the clear filtrate and placed in a dry ice-methanol bath, while maintaining the nitrogen stream. The precipitate was recovered and dried over phosphorous pentoxide in an Abderhalden drying apparatus with refluxing hexane for 24 hours providing a purified, about 99.5 percent pure, (TABH).

3,3'-Diaminobenzidine (DABD) was obtained from Aldrich Chemical Company and purified further by the above procedure with respect to the purification of TABH.

Polyphosphoric acid (PPA) and phosphoric acid (ACS reagent grade) were obtained from Aldrich Chemical Company and used as received. Phosphorous pentoxide, $P_2O_5$, was obtained from J. T. Baker Inc. and was used as received.

SYNTHESIS AND CHARACTERIZATION OF BBL AND BBB BY POLYCONDENSATION REACTIONS

Although not wishing to be limited by theory, factors believed to be important in achieving high molecular weight BBL and BBB compounds are high purity of the starting monomers; use of monomers in appropriate stoichiometric amounts, preferably equimolar quantities; maintaining high effective phosphorous pentoxide, $P_2O_5$, content; and high concentration of reactants of, for example, greater than or equal to about 10 weight percent.

PREPARATIVE EXAMPLE I

Synthesis of BBL

Polybenzimidazo-benzophenanthroline-type ladder polymer (BBL) was prepared by the polycondensation of the purified NTCA and the purified TABH following the aforementioned general method of Arnold and Van Deusen and the addition method of J. F. Wolfe, Proc. ACS Div. Polym. Mat. Sci. Eng., 54, 99 (1986), the disclosures of which are totally incorporated herein by reference. 85.65 grams of 77 percent PPA (polyphosphoric acid) were prepared by diluting 60.8 grams of 83.3 percent PPA with 24.84 grams of phosphoric acid. The mixture was shaken vigorously and heated under vacuum to 100° C. for 2 to 3 hours and allowed to cool down to room temperature, about 25° C., over 16 hours. The vacuum was replaced by a nitrogen atmosphere. To prepare 5 grams of BBL, 4.248 grams (14.96 millimols) of TABH were carefully weighed and placed in a custom made (from ACE Glass Company), 500 milliliters, reaction vessel with provisions for a throughbore mechanical stirrer, vacuum line, nitrogen inlet and vent, and a side arm for adding reagents. There were added to the reactor 26 grams of 77 percent PPA under a nitrogen purge. The vacuum grease was carefully applied to all joints to prevent leaks. The reaction vessel was immersed in a 2,000 milliliter beaker oil bath. The beaker was placed on a PMC programmable hot plate/stirrer with a temperature probe immersed in the oil bath. The entire set up was supported by a Cole Palmer "Jiffy-Jack" which allowed for easy control and moderation of the reaction and the height of the reaction vessel such that the reaction mixture did not rise above the mechanical stirrer paddles. Dehydrochlorination was carried out at 80° to 90° C. under vacuum of 600 to 750 millimeters of Hg. Complete dehydrochlorination is achieved when all outgassing ceases. The vacuum was released under nitrogen and the temperature allowed to cool to 50° C. for NTCA addition. 4.55 grams of NTCA (14.96 millimols) were added under nitrogen to the reaction vessel. The mixture was stirred slowly, about 25 rpm, for 20 minutes and then 17 grams of phosphorus pentoxide were added using a Tygon tube. The temperature was increased to 80° C. with the reaction vessel under vacuum. The stirring speed was increased slowly and nitrogen gas was allowed to enter into the vessel occasionally. After complete dissolution of the monomers and P₂O₅, vacuum was released and the temperature was raised in stages of 100°, 140°, 160°, 180° C. over 6 hours. This was accompanied by noticeable color changes, orange to red and eventually becoming metallic green. The reaction was allowed to proceed for 24 hours at 180° C.

The highly viscous polymerization solution was allowed to cool down to 60° C. and the polymer was scooped out with a TEFLON ® coated spatula. The product was then precipitated by suspending in deionized water and the mixture was refluxed for 3 days. The water was changed at least twice each day to ensure that the polymer product was free of residual phosphorous containing contaminants. The product was identified as BBL by comparison of spectral and physical data with those reported previously.

PREPARATIVE EXAMPLE II

Synthesis of BBB

Polybenzimidazo-benzophenanthroline semi-ladder polymer (BBB) was prepared by the polycondensation of 1,4,5,8-naphthalene tetracarboxylic acid (NTCA) and 3,3'-diaminobenzidine (DABD) by essentially repeating the procedure of Example I. With pure and chlorine free 3,3'-diaminobenzidine, that is 3,3',4,4'-diaminobenzidine, a dehydrochlorination step of a hydrochloride salt is not required. However, for achieving product purity of greater than 99 percent of the ladder polymers and maximum photosensitivity, a dehydrochlorination procedure ensures complete elimination (thermal liberation) of residual hydrogen chloride from the benzidine. This was accomplished by following the approach illustrated in the aforementioned purification of TABH.

Characterization

Intrinsic viscosity [η-eta] was measured in methanesulfonic acid at 30° C. BBL has an intrinsic viscosity of 8.2 dl/gram while that of BBB was 3.7 dl/gram. These intrinsic viscosity data indicate that the polymers have high molecular weights, for example BBL in the range of about 25,000 to about 200,000, and BBB of about 100,000 to about 200,000, which characterization has been reported, for example, by G. C. Berry and S. P. Yen, Addition and Condensation Polymerization Processes, Advances in Chemistry Series No. 91; ACS; Washington, D.C., 1969; pages 734 to 756. Thermogravimetric Analysis (TGA) in nitrogen revealed that BBL was stable up to 720° C. without showing any weight loss while BBB was stable up to about 700° C. in agreement with previously reported data. Infrared spectra were in agreement with previously published spectra. The electronic absorption spectra of thin films of BBL and BBB show visible absorption bands (pi to pi star transitions) at 560 and 540 nanometers, respectively, which are in agreement with values reported in the literature, S. A. Jenekhe and P. O. Johnson, Macromolecules, 23, 4419 (1990), the disclosure of which is totally incorporated herein by reference.

EXAMPLE III

Preparation of Generator Layer Thin Films

Viscous solutions of BBL and BBB were prepared by the method of Lewis acid coordination complexation as reported, for example, in U.S. Pat. No. 4,963,616 to Jenekhe, issued Oct. 6, 1990, and in U.S. Pat. No. 4,945,156 to Jenekhe et al., issued Jul. 31, 1990, the disclosures of which are totally incorporated herein by reference. For example, to prepare 0.2 to 0.6 micrometer thin films, a 1.8 to 2 weight percent of ladder type polymer solution in aluminum chloride/nitromethane was prepared and spin coated onto glass substrates. Spinning speeds of 2,500 to 3,000 rpm for 20 to 30 seconds were used in preparing high quality films. Films on aluminum substrates were precipitated in water. The water was changed at least twice per day. Although overnight regeneration would normally suffice, the regeneration process was allowed to proceed for at least two days, and typically for one week. The resultant films were subsequently dried in a vacuum oven at 80° C. for 16 hours.

EXAMPLE IV

DEVICE FABRICATION AND TESTING

The above charge generator layer comprising BBL approximately 15 micrometers thick was overcoated with a hole transport layer comprised of 60 weight percent of the polycarbonate MAKROLON ® obtained from Farbensfabriken Bayer AG, and 40 percent of aryl diamine hole transport molecules prepared as follows. A solution containing 4.2 grams of MAKROLON ®, a polycarbonate resin obtained from Farbensfabriken Bayer A.G., 2.8 grams of N,N'-bis(3''-methylphenyl)-1,1'-biphenyl-4,4'-diamine prepared as disclosed in U.S. Pat. No. 4,265,990, the disclosure of which is totally incorporated herein by reference, was prepared by dissolving the above materials in 31 milliliters of methylene chloride inside a 2 ounce amber bottle. The hole transport layer was obtained by coating the solution onto the charge generator layer using a 3.5 inch wide, 5 mil wet gap Bird Film Applicator, resulting in a transport layer about 27 microns thick. The resulting photoconductive device was air dried for about 1 hour and vacuum dried at 100° C. for about 16 hours before evaluation on a flat plate imaging test fixture. More specifically, the imaging member thus prepared was evaluated as follows. Xerographic measurements were made on a flat plate scanner using 2 inch by 2.5 inch samples of the imaging member prepared as described herein. The surface potential of the device was monitored with a capacitively coupled ring probe connected to a Keithley electrometer (Model 610C) in the coulomb mode. The output of the electrometer was displayed on a strip chart recorder (HP Model 740A) which was calibrated by applying known voltage on an uncoated aluminum substrate. The exposure wavelength was adjusted using interference filters to 750 nanometers which is close to the wavelength of radiation emitted by solid state lasers (780 nanometers). With the shutter closed, the dark decay was measured. With the shutter open, the photosensitivity at a known light exposure was recorded. The imaging member was charged to about −1,000 volts at the maximum or peak voltage and was allowed to discharge in the dark for 2 to 3 seconds to determine the dark decay. Subsequently, the imaging member was exposed to an erase lamp to photodischarge the surface charge and to determine its residual voltage ($V_R$). Thereafter, the imaging member was charged in a similar manner and exposed to visible radiation at the dark development potential, and the sensitivity of the member was determined in terms of $E_{\frac{1}{2}}$, which represents the energy required to discharge half of the dark development potential. The imaging member exhibited a dark development potential ($V_{ddp}$) of −900 volts, a dark decay of −20 volts per second, an $E_{0.5ddp}$, the energy to discharge half the potential, at 750 nanometers of 3.5 erg/cm², and an $E_{0.5ddp}$, the energy to discharge half the potential, at 800 nanometers of 11 erg/cm², an $E_{0.5ddp}$, the energy to discharge half the potential, at 850 nanometers of 32 erg/cm².

The above photoreceptor device was then incorporated into a xerographic imaging test fixture and there resulted, subsequent to development of the formed latent images with a toner comprised of 88 percent by weight of styrene n-butyl methacrylate (58/42) resin particles, 10 percent by weight of REGAL 330® carbon black, and 3 percent by weight of the charge additive distearyl dimethyl ammonium methyl sulfate, copies of excellent resolution and high quality.

EXAMPLE V

A generation layer as described in Example III was prepared with the exception that the charge generator layer is 18 micrometers thick and incorporates ladder type polymer BBB. A transport layer was prepared according to the procedure of Example IV. Essentially, the same imaging results as Example IV were obtained using the near IR exposure as in Example IV.

EXAMPLE VI

A generation layer as described in Example III is prepared with the exception that the charge generator layer is 20 micrometers thick and incorporates ladder type polymer BBL. An overcoated transport layer is not applied to the generator layer in this Example. This photoreceptor device is incorporated into a xerographic imaging test fixture and charged positively resulting in, subsequent to development of the formed latent images with a negatively charging toner comprised of 87 percent by weight of styrene n-butyl methacrylate (58/42) resin particles, 10 percent by weight of REGAL 330® carbon black, and 3 percent by weight of the negative charge additive TRH, available from Hodogaya Chemical Company of Japan, copies of excellent resolution, that is substantially no background deposits, and high edge acuity of printed lines and text characters.

EXAMPLE VII

The photoconductive BBB layer as prepared in Example III is used with the exception that the layer is 20 micrometers thick. The photoconductive element is charged positively and the latent images developed with a negatively charging toner using BONTRON E-88 TM as disclosed, for example, in U.S. Pat. No. 4,845,003, available from Orient Chemical Company of Japan, as the negative charge control additive as in Example VI, resulting in images with excellent resolution and high quality.

EXAMPLE VIII

A charge generation layer as described in Example III is prepared with the exception that the charge generator layer is thin, that is a thickness of about 0.5 micrometer and incorporates ladder type polymer BBL. A transport layer was prepared according to the procedure of Example IV. Imaging is accomplished with broad spectrum white light using an incandescent lamp for illumination. The photoconductive member is charged negatively and the latent image is developed as in Example IV. Images obtained are substantially similar to those obtained in Example IV.

Other modifications of the present invention will occur to those skilled in the art subsequent to a review of the present application. These modifications, and equivalents thereof are intended to be included within the scope of this invention.

What is claimed is:

1. A photoconductive imaging member comprised of a supporting substrate, a photogenerating layer comprised of a ladder polymer selected from the group consisting of those represented by the following formulas:

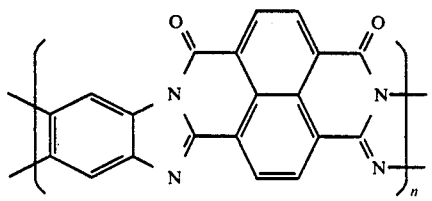

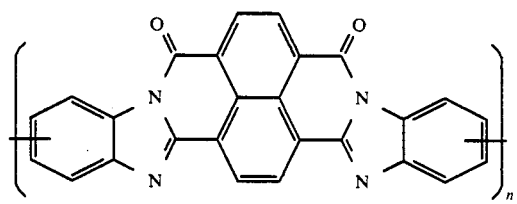

and mixtures thereof, wherein n represents the number of segments, and a charge transport layer.

2. A photoconductive imaging member comprised of a supporting substrate, a photogenerating layer comprised of a ladder polymer of the formula selected from the group consisting of those represented by the following formulas:

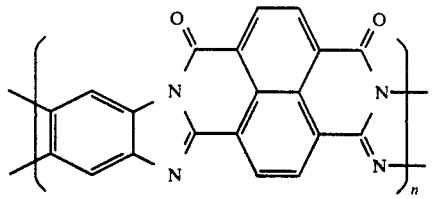

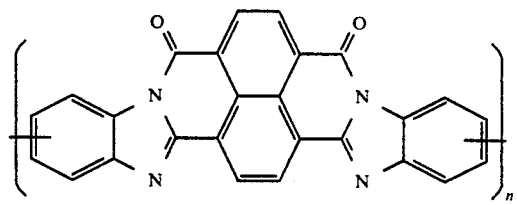

wherein n represents the number of segments, and a hole transport layer.

3. An imaging member in accordance with claim 1 wherein the ladder polymer is of the following formula:

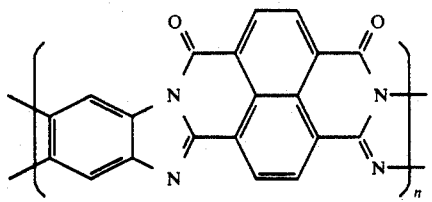

wherein n is an integer from between about 10 to about 1,000.

4. A photoconductive imaging member in accordance with claim 1 wherein the photogenerating layer is in contact with and is situated between the supporting substrate and the charge transport layer.

5. A photoconductive imaging member in accordance with claim 1 wherein the charge transport layer is in contact with and is situated between the supporting substrate and the photogenerating layer.

6. A photoconductive imaging member in accordance with claim 1 wherein the photoconductive imaging member includes a metal oxide hole blocking layer in contact with and situated between the supporting substrate and the photogenerating layer.

7. A photoconductive imaging member in accordance with claim 6 wherein the metal oxide is aluminum oxide.

8. A photoconductive imaging member in accordance with claim 6 wherein the metal oxide hole blocking layer has a thickness of from between about 100 and about 500 Angstroms.

9. A photoconductive imaging member in accordance with claim 6 wherein the photoconductive imaging member contains an adhesive interface layer in contact with and situated between the supporting substrate and the metal oxide hole blocking layer.

10. A photoconductive imaging member in accordance with claim 9 wherein the adhesive interface layer comprises a polymeric material selected from the group consisting of polyester, polyvinylbutyral, and polyvinyl pyrrolidone.

11. A photoconductive imaging member in accordance with claim 10 wherein the adhesive interface layer has a thickness of from between about 0.1 and 0.6 micron.

12. A photoconductive imaging member in accordance with claim 1 wherein the supporting substrate is a metal.

13. A photoconductive imaging member in accordance with claim 12 wherein the metal is aluminum or titanium.

14. A photoconductive imaging member in accordance with claim 2 wherein the supporting substrate is an organic polymeric composition.

15. A photoconductive imaging member in accordance with claim 2 wherein the supporting substrate has a thickness of from about 3 to about 100 mils.

16. A photoconductive imaging member in accordance with claim 2 wherein the photogenerating layer has a thickness of from about 0.05 to about 10 microns.

17. A photoconductive imaging member in accordance with claim 2 wherein the charge transport layer has a thickness of from about 5 to about 50 micrometers.

18. A photoconductive imaging member in accordance with claim 1 wherein the hole transport layer comprises an aryl amine compound.

19. A photoconductive imaging member in accordance with claim 18 wherein the aryl amine comprises molecules of the formula:

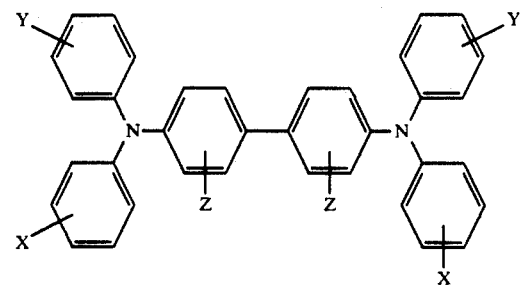

dispersed in a highly insulating and transparent organic resinous binder wherein X, Y and Z are selected from the group consisting of hydrogen, an alkyl group with from 1 to about 25 carbon atoms and a halogen, and at least one of X, Y and Z is independently an alkyl group or a halogen.

20. A photoconductive imaging member in accordance with claim 19 wherein X is selected from the group consisting of ortho (CH$_3$), meta (CH$_3$), para (CH$_3$), ortho (Cl), meta (Cl), and para (Cl).

21. A photoconductive imaging member in accordance with claim 19 wherein the resinous binder is a polyester, a polyvinyl butyral, a polystyrene, a polycarbonate, or a polyvinyl formal.

22. A photoconductive imaging member comprised of a supporting substrate, and a photogenerating layer in contact therewith comprised of a ladder polymer of the formula selected from the group consisting of those represented by the following formulas:

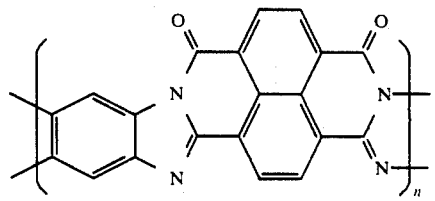

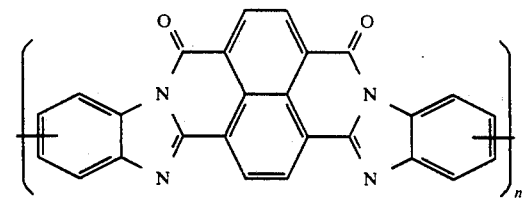

wherein n represents the number of segments, and wherein n represents a number from about 10 to about 1,000.

23. A photoconductive imaging member in accordance with claim 22 wherein the thickness of said photogenerating layer is about 25 nanometers.

24. A photoconductive imaging member in accordance with claim 22 wherein said imaging member charges both positively and negatively.

25. A photoconductive imaging member in accordance with claim 1 wherein said charge transport layer is comprised of a polysilylene.

26. A photoconductive imaging member in accordance with claim 1 wherein said charge transport layer is comprised of a poly(aryl amine) compound.

27. A method of imaging comprising the steps of
(a) generating an electrostatic image on the photoconductive imaging member of claim 1;
(b) subsequently developing the electrostatic image;
(c) transferring the developed electrostatic image to a suitable substrate; and
(d) permanently affixing the transferred image to the substrate.

28. A method of imaging in accordance with claim 27 wherein the electrostatic image is developed by cascade, touchdown, powder cloud, or magnetic brush methods.

29. A method of imaging in accordance with claim 27 wherein the developed electrostatic image is transferred to a substrate by means of a corotron or a biased roll.

30. A method of imaging in accordance with claim 27 wherein the substrate is paper.

31. A photoconductive imaging member in accordance with claim 1 wherein the photogenerating layer is comprised of a ladder polymer selected from the group consisting of those represented by the following formulas:

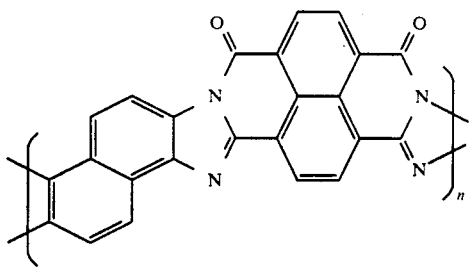

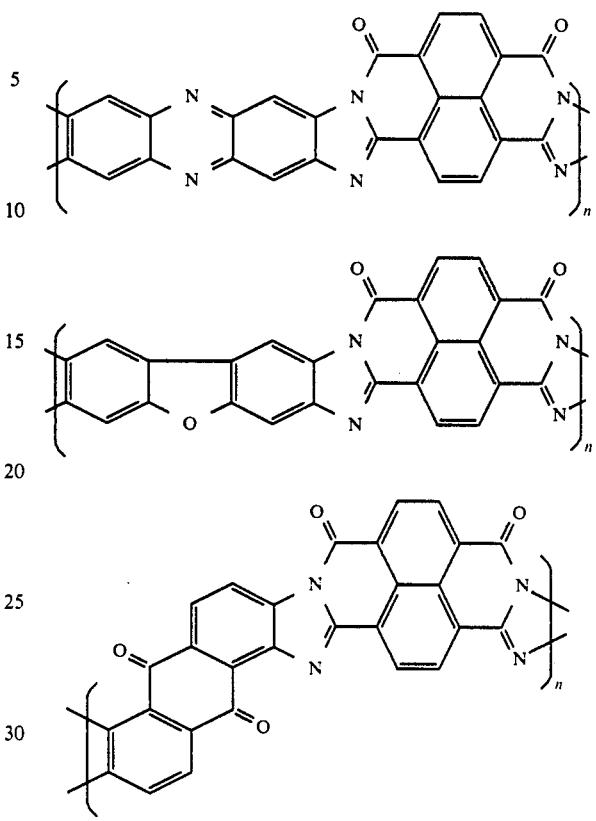

and mixtures thereof, wherein n represents the number of segments, and a charge transport layer.

32. A photoconductive imaging member in accordance with claim 1 wherein the molecular weight of said ladder polymer is from about 25,000 to about 200,000.

33. A photoconductive imaging member in accordance with claim 1 wherein the molecular weight of said ladder polymer is from about 100,000 to about 200,000.

34. The photoconductive imaging member in accordance with claim 2 wherein the molecular weight of said ladder polymer is from about 25,000 to about 200,000.

35. A photoconductive imaging member in accordance with claim 1 wherein n is a number from about 10 to about 1,000.

36. A photoconductive imaging member in accordance with claim 2 wherein n is a number from about 10 to about 1,000.

* * * * *